(12) United States Patent
Worsley

(10) Patent No.: US 9,064,117 B1
(45) Date of Patent: Jun. 23, 2015

(54) MOBILE PROVISIONING DEVICE

(75) Inventor: Timothy C. Worsley, Snoqualmie, WA (US)

(73) Assignee: Amazon Technologies, Inc., Reno, NV (US)

( * ) Notice: Subject to any disclaimer, the term of this patent is extended or adjusted under 35 U.S.C. 154(b) by 731 days.

(21) Appl. No.: 13/237,644

(22) Filed: Sep. 20, 2011

(51) Int. Cl.
*G06F 21/00* (2013.01)
*H04K 1/00* (2006.01)
*G06F 21/57* (2013.01)
*G06F 9/44* (2006.01)
*G06F 11/14* (2006.01)
*G06F 11/30* (2006.01)

(52) U.S. Cl.
CPC ............ *G06F 21/575* (2013.01); *G06F 9/4416* (2013.01); *G06F 11/3006* (2013.01); *G06F 11/1415* (2013.01)

(58) Field of Classification Search
CPC . G06F 21/575; G06F 9/4416; G06F 11/1415; G06F 11/3006
USPC ........ 713/155–159; 726/21, 27; 380/247–250
See application file for complete search history.

(56) References Cited

U.S. PATENT DOCUMENTS

| | | | |
|---|---|---|---|
| 5,680,547 A | 10/1997 | Chang | |
| 5,826,015 A | 10/1998 | Schmidt | |
| 5,892,906 A | 4/1999 | Chou et al. | |
| 6,484,262 B1 | 11/2002 | Herzi | |
| 7,194,619 B2 | 3/2007 | Abbondanzio et al. | |
| 7,313,690 B2 | 12/2007 | Miller | |
| 7,664,834 B2 | 2/2010 | Keith, Jr. | |
| 7,822,863 B2 | 10/2010 | Balfanz et al. | |
| 7,958,506 B2 | 6/2011 | Mann | |
| 8,102,881 B1 | 1/2012 | Vincent | |
| 8,332,490 B2 | 12/2012 | Bozek et al. | |
| 8,381,264 B1 | 2/2013 | Corddry et al. | |
| 8,386,589 B2 | 2/2013 | Keefe et al. | |
| 8,707,402 B1 | 4/2014 | Worsley | |
| 2004/0199758 A1 | 10/2004 | Meaney et al. | |
| 2005/0075115 A1* | 4/2005 | Corneille et al. | .......... 455/456.3 |
| 2006/0200539 A1 | 9/2006 | Kappler et al. | |
| 2009/0031026 A1 | 1/2009 | Tanner et al. | |
| 2009/0150525 A1 | 6/2009 | Edgett et al. | |
| 2009/0201830 A1 | 8/2009 | Angelot et al. | |
| 2009/0276618 A1* | 11/2009 | Madjlessi | .......... 713/2 |
| 2010/0017597 A1 | 1/2010 | Chandwani | |
| 2010/0057890 A1 | 3/2010 | DeHaan | |
| 2010/0191852 A1 | 7/2010 | Black et al. | |
| 2010/0325736 A1 | 12/2010 | Sadovsky et al. | |
| 2011/0125990 A1 | 5/2011 | Khosravi et al. | |
| 2011/0320799 A1 | 12/2011 | Lam | |
| 2012/0011354 A1* | 1/2012 | Owen | .......... 713/2 |

(Continued)

OTHER PUBLICATIONS

Office action for U.S. Appl. No. 13/166,641, mailed on Jul. 2, 2013, Worsley, "Secure Computer Provisioning", 14 pages.

(Continued)

*Primary Examiner* — M Elamin
(74) *Attorney, Agent, or Firm* — Lee & Hayes, PLLC

(57) ABSTRACT

A mobile provisioning device is configured for use in conjunction with a provisioning service/authority. Upon connection to a target computer, the mobile provisioning device emulates a boot device, and provides a boot image for booting by the target computer. The mobile provisioning device and/or the target computer may communicate with the provisioning service/authority for various purposes, including authentication, reporting, and provisioning.

34 Claims, 6 Drawing Sheets

(56) References Cited

U.S. PATENT DOCUMENTS

| | | | |
|---|---|---|---|
| 2012/0066750 | A1 | 3/2012 | Mcdorman et al. |
| 2012/0179900 | A1 | 7/2012 | Temporelli |
| 2012/0214441 | A1 | 8/2012 | Raleigh |
| 2012/0265984 | A1 | 10/2012 | Ramanujan |
| 2012/0272090 | A1* | 10/2012 | Poisner .............................. 714/3 |
| 2012/0322422 | A1* | 12/2012 | Frecks et al. ............... 455/414.1 |
| 2013/0013910 | A1 | 1/2013 | Temporelli et al. |

OTHER PUBLICATIONS

Office action for U.S. Appl. No. 13/231,523, mailed on Aug. 21, 2013, Worsley, "Secure Computer Provisioning and Operation", 9 pages.

Office action for U.S. Appl. No. 13/231,523, mailed on Jan. 16, 2013, Worsley, "Secure Computer Provisioning and Operation", 10 pages.

Office action for U.S. Appl. No. 13/166,641, mailed on Dec. 13, 2012, Worsley, "Secure Computer Provisioning", 11 pages.

Final Office Action for U.S. Appl. No. 13/166,610, mailed on Oct. 11, 2013, Tmothy C. Worsley, "Global Computer Provisioning", 13 pages.

Office action for U.S. Appl. No. 13/166,610, mailed on Mar. 26, 2013, Worsley, "Global Computer Provisioning", 12 pages.

Office Action for U.S. Appl. No. 13/237,693, mailed on Jan. 30, 2014, Timothy C. Worsley, "Secure Dynamic Network Configuration", 9 pages.

Office Action for U.S. Appl. No. 13/166,610, mailed on Jan. 30, 2015, Timothy C. Worsley, "Global Computer Provisioning", 17 pages.

\* cited by examiner

MOBILE PROVISIONING DEVICE

BACKGROUND

Online services are designed so that their capacities can be expanded by adding computer servers. A large online service may be supported by thousands of servers or server instances, which are largely indistinguishable from each other.

Before it becomes operational, each server is provisioned with the software that is responsible for the specialized functions of the server. Provisioned software may include operating systems, utilities, drivers, applications, and so forth.

Computer servers can be provisioned manually, by technicians who supply physical media from which the servers may install selected software. Automated provisioning processes are also used, in which servers automatically utilize a local network connection to download their operating software.

Although there are standard protocols for implementing automated provisioning, the protocols often rely upon the security of the local network environment. At times, however, it may be desired to provision computers in network environments that are not yet secure, or that have limited operational capabilities.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
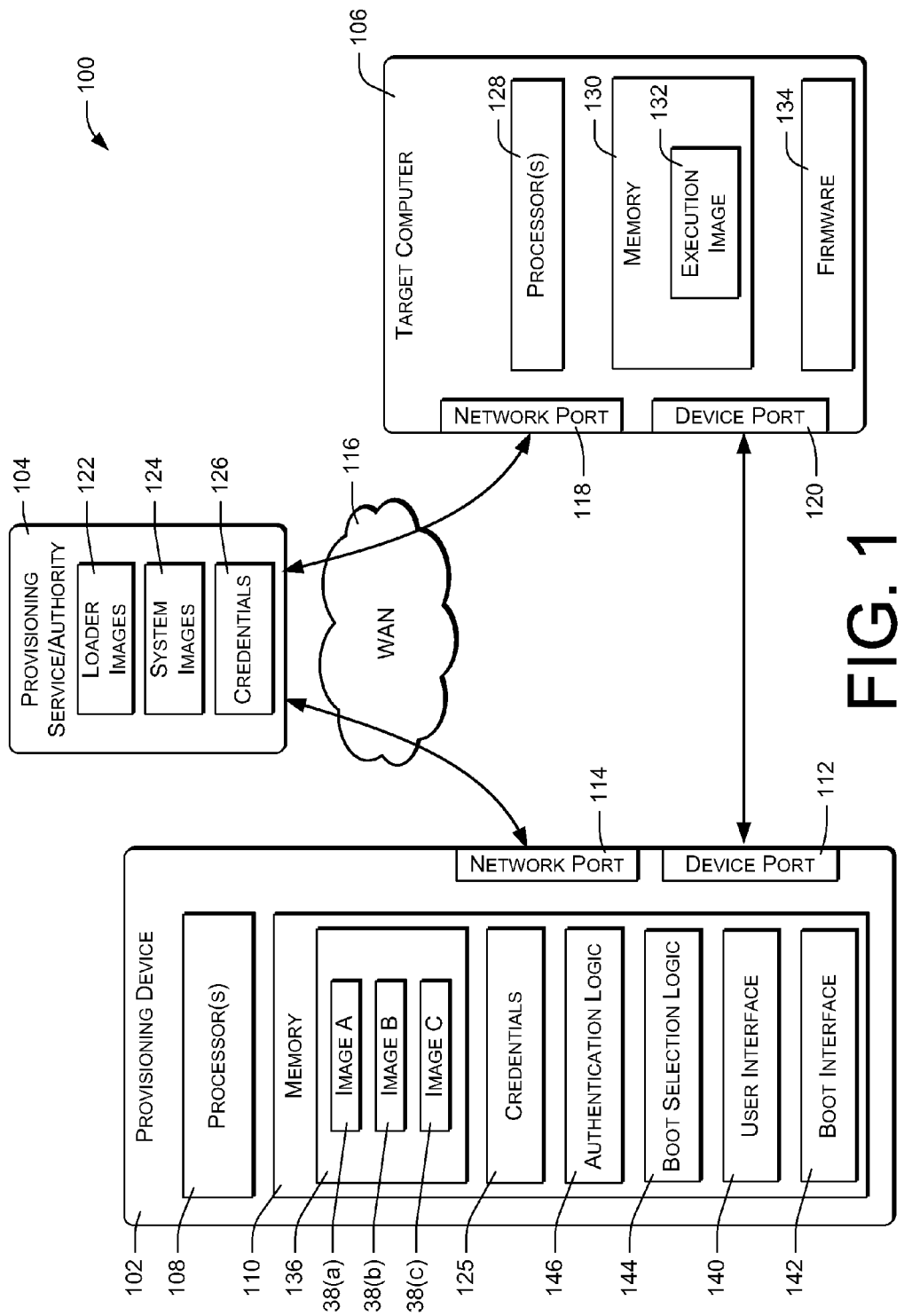
FIG. 1 is a block diagram illustrating a system and environment for provisioning networked computers from a mobile provisioning device.

This disclosure describes systems, devices, and techniques that can be used for provisioning computers, servers, and other networked devices. In certain embodiments described below, a mobile provisioning device is initialized to contain one or more boot images. The mobile provisioning device is connected to a target computer and configured to act as a boot device. The target computer then boots using one of the boot images stored on the mobile device.

The boot image accessed by the target computer may in some situations comprise a system image—a full operational system that upon loading and initiation will perform the ultimate intended operations of the target computer. In other situations, the boot image may comprise a bootloader or system loader image, which is executed by the target computer to perform further boot and provisioning operations. In particular, the system loader may be configured to program or configure computer firmware, to establish network communications, to contact a provisioning server or service, to download and install a system image, and to reboot using the downloaded system image.

In certain embodiments, the boot image provided by the mobile provisioning device causes or configures the target computer to utilize automated network-based provisioning procedures, even in situations where local configuration servers are not trusted or are not subject to customized configuration or control. In these embodiments, the boot image contains or specifies a global identification of a specific provisioning server or service from which the target computer is to be provisioned. After obtaining a local network configuration from a local, possibly untrusted or insecure configuration server, the target computer establishes communications with the provisioning server or service that has been identified within the boot image rather than any provisioning server that might have been identified by the local configuration server. The computer then boots and/or provisions itself from this provisioning server or service.

The boot image can be additionally or alternatively configured to cause or configure the target computer to verify or confirm the identity of the provisioning server using cryptographic authentication techniques or other means. For example, the boot image may request that the provisioning server authenticate itself by providing a signature that can be validated using cryptographic techniques. Similarly, the target computer may authenticate itself to the provisioning server by providing a digital signature or other credentials that have been specified by or within the boot image.

Further remote provisioning techniques may include specifying an identification or code in the boot image, and subsequently providing the configuration identification or code to the provisioning service to indicate an intended configuration for the target computer. The provisioning service may serve multiple customers and/or computer configurations, and the configuration code may allow the provisioning service to determine which of many available configurations should be used to provision a requesting target computer. In some cases, the configuration identification or code may comprise an identification of the target computer, such as a serial number or other globally unique identifier. In other cases, the configuration identification may identify the target computer with reference to a previous registration of the target computer with the provisioning service.

In conjunction with these operations, the mobile provisioning device may contact the provisioning service to report its activities. Specifically, the mobile provisioning device may report the identity or identification of any booted target computers, and the fact that a particular configuration and/or credentials were granted to the target computer. The provisioning service may record this information so that it knows how to respond to subsequent requests by the target computer. For example, the provisioning service may provide system images only to requesting target computers that have previously been identified by the mobile provisioning device or by a technician associated with the mobile provisioning device. As another example, the provisioning service may determine which of multiple system images to provide to a target computer, based on information previously provided by the mobile provisioning device or its user. The mobile provisioning device may also be used by a technician to identify, prior to provisioning, a target computer that is about to be provisioned. The technician may provide various information about the target computer, such as its characteristics, capacities, and intended functionality. This information may be relayed to the provisioning service, which may use the information to determine how to provisions the target device.

FIG. 1 shows an environment 100 in which a mobile provisioning device 102 is used in conjunction with a provisioning service/authority 104 to provision a target computer 106.

The mobile provisioning device 102 may comprise a handheld device similar to a smartphone, personal digital assistant, tablet PC, or other portable device. The provisioning device 102 may be battery-powered and may be rechargeable. It may be relatively small, so that it can be easily carried by a technician. It may be configured to perform a variety of functions in addition to those described herein, including diagnostic and analytic functions.

The provisioning device has operating logic, which in the described embodiment is formed by one or more processors 108 in conjunction with computer-readable memory 110. The memory 110 may comprise any combination of different types of memory, including system storage, electronic memory, firmware, and so forth. It may further include both integral memory and removable memory devices.

The memory 110 is used to store data and programs. Programs include modules, components, routines, and so forth, which in turn comprise sequences of instructions that are executable by the processor(s) 108. Certain of the programs are designed and configured to implement the various functionality that is attributed below to the provisioning device 102. The memory 110 may also include programs for implementing functionality that is peripheral to the functionality describe herein, or for implementing unrelated functionality.

In the described embodiment, the provisioning device 102 has a wired device communications port 112 for connection to and communications with the target computer 106. The device port 112 may comprise a universal serial bus (USB) port, as one example. The device port 112 may utilize standard or customized protocols to communicate with the target computer 106. In one embodiment, the device port 112 can be configured to emulate a boot device, so that the target computer 106 can boot from a boot image presented by the provisioning device 102 at the device port 112.

The illustrated provisioning device 102 may also have a network port 114 or other type of communications port or interface that is capable of communicating with a remote server or device such as the provisioning service/authority 104. For example, the network port 114 may comprise an Ethernet port or a wireless 802.11x network interface. In certain embodiments, the network port may comprise a cellular or other telecommunications radio and associated communications hardware, and may allow wireless data communications with the provisioning service/authority and other network entities, regardless of the location of the provisioning device 102.

Communications between the provisioning device 102 and the provisioning service/authority 104 may be facilitated by a wide-area network (WAN) 116, which may include a variety of different interconnected networks and network technologies. The WAN 116 may include private cellular and telecommunications networks, organizational networks, local wireless networks, and so forth, and may facilitate or be part of a shared public network such as the Internet. Communications may be encrypted, and may utilize virtual connections such as virtual private networks (VPNs).

The target computer 106 is configured to be provisioned from the provisioning service/authority 104 and/or the provisioning device 102. In this embodiment, the target computer 106 has a network interface device or port 118, or other type of communications port or interface that is capable of communicating with a remote server or device such as the provisioning service/authority 104. For example, the network port 118 may comprise an Ethernet port or a wireless 802.11x network interface. Alternatively, the network port 118 may communicate using cellular and/or telecommunications networks and protocols. Communications between the target computer 106 and the provisioning service/authority 104 may be by means of the illustrated WAN 116 or by other means.

The target computer 106 may also have a device port 120 for communications with local devices such as the provisioning device 102. The target computer device port 120 may comprise a USB port or some other type of wired or wireless interface that is compatible with the device port 112 of the provisioning device 102.

The provisioning service/authority 104 may comprise a single server, multiple independent servers performing different functions, multiple servers that are configured as an integrated service, and so forth. It may include or comprise a boot image server, which may be implemented using a protocol such as the Preboot eXecution Environment (PXE). PXE is an example of a protocol that can be used to automatically provision computers in a networked environment.

The provisioning service/authority 104 may perform various authentication and administrative functions, some of which will be described in more detail below. For example, the provisioning service/authority 104 may store a plurality of various different target computer configurations, including boot images. The boot images may include system loader or bootloader images 122 and system images 124. A system loader is a relatively small program that can be used in initial stages of booting a computer, and which is often configured to load and execute a larger, higher-level operating program. A system image is a larger program or data image, often containing an entire operating environment. A system image is normally downloaded and stored in some type of non-volatile memory of a target computer, and forms either a large part or the entirety of the ultimate operating functionality of the target computer. After provisioning, the target computer loads and executes the system image for its intended operation. Different system images may be used for target computers that are intended for different type of functionality.

The provisioning service/authority 104 may also perform various security functions, such as authentication and authorization for different provisioning devices and target computers. For example, the provisioning device 102 may be configured so that its operations are contingent upon periodically authenticating with the provisioning service/authority 104. In addition, target computers attempting to provision themselves from the provisioning service/authority 104 may need to authenticate with the provisioning service/authority 104 prior to provisioning.

The provisioning service/authority 104 may store or generate credentials 126 for eventual distribution to provisioning devices and target computers. Credentials may comprise information such as keys, passwords, and so forth, to allow other devices and computers to subsequently authenticate with the provisioning service/authority 104. The credentials 126 may include information allowing the provisioning service/authority 104 to verify the identity of external devices, and may also include information allowing the external devices to verify the identity of the provisioning service/authority 104.

The credentials 126 may comprise public/private key pairs, generated in accordance with public key cryptography techniques. Credentials may also comprise certificates or signatures that have been created and/or signed using public key cryptography techniques.

The provisioning service/authority 104 is capable of communicating with the provisioning device 102 and the target computer 106 over the WAN 116, or over different networks.

In addition, the provisioning service/authority 104 may in some situations be capable of communicating with the provisioning device 102 using the device port 112 of the provisioning device 102. The provisioning service/authority 104 is generally considered to be a secured and controlled system, from which authentication, validation, and so forth may be performed.

The target computer 106 typically has a processor 128 and associated computer-readable memory 130. The memory may include volatile and non-volatile memory of various types, including electronic, optical, magnetic devices and media. The memory 130 may also include integral memory and removable memory.

An execution image 132 is typically stored in the memory 130, usually in some form of integral, non-volatile memory of the target computer 106. In many embodiments, the execution image 132 is stored on a non-volatile hard disk of the target computer 106. The execution image 132 may also be stored on external memory, such as by an external boot device. The execution image 132 may comprise one of the loader images 122 or system images 124 described above with reference to the provisioning service/authority 104.

The target computer 106 may also have firmware 134, containing low-level boot instructions that are the first instructions executed by the target computer 106 upon startup. Upon execution during computer startup, the firmware 134 may load and execute a bootloader or system loader, which in turn accesses the memory 130 to initiate execution of the execution image 132. The execution image 132 thus forms the operating logic of the target computer, and defines the ultimate functionality and characteristics of the target computer 106.

The firmware 134 may be distributed among various different components of the target computer 106, such as on the computer system board or on various peripheral devices. The network port 118, for example, may be implemented by a network interface component upon which firmware 134 resides. Firmware associated with the network interface component may execute upon startup to initialize hardware and to perform initial communications with configuration servers and provisioning servers. Certain types of computer storage devices, such as hard disks, may also have their own firmware that is executed upon startup of the target computer 106.

The firmware 134 is typically stored in a form of non-volatile memory such as programmable flash memory. The firmware can be configured, initialized, and/or programmed by appropriate software, and may be initialized during computer provisioning by a boot loader such as mentioned above.

The provisioning device 102 includes image memory 136 for storing boot images. Various types of memory can be used for this purposes, such as electronic memory, flash memory, optical memory, and so forth. Boot images may be stored or archived as non-volatile images, and/or stored temporarily as they are being downloaded and/or provided to provisioned computers.

The boot images stored within the image memory 136 may comprise loader images and/or system images. In FIG. 1, the images are labeled "Image A," Image B," and "Image C," and designated by reference numerals 138(a), 138(b), and 138(c).

The boot images 138 may be received from the provisioning service/authority 104 during an initialization procedure, in which the provisioning service/authority 104 sets up the provisioning device 102 for use in provisioning various types of target computers. During such an initialization procedure, the provisioning device 102 may be physically or locally connected to the provisioning service/authority 104, such as by means of the USB device port 112 of the provisioning device 102. During the initialization, various or selected loader images 122 and/or system images 124 may be loaded onto the provisioning device 102 for subsequent use in provisioning various types of target computers. Alternatively, the provisioning device 102 may communicate with the provisioning service/authority 104 using the network port 114 to obtain the boot images 138, to update the boot images 138, and/or to obtain additional boot images 138. In certain embodiments, these communications may be performed wirelessly and remotely, without physical connection of the provisioning device 102 to the provisioning service/authority 104.

In addition, the provisioning device 102 may obtain security-related information for use by target computers during subsequent provisioning procedures. Specifically, the provisioning device 102 may obtain and store one or more of the security credentials 126 that can be subsequently issued to target computers, and that can be used by the target computers to perform authentication with the provisioning service/authority 104. The security credentials 126 may be obtained directly from the provisioning service/authority 104 and stored for future distribution to target computers. In some situations, the credentials 126 may be used by the provisioning device 102 to generate additional credentials for distribution to target computers 106.

Note that although the credentials 126 in this embodiment are shown as originating with the provisioning service/authority 104, they might alternatively be generated by and obtained from other entities, and subsequently reported to the provisioning service/authority 104. In one alternative embodiment, the provisioning device 102 may generate the credentials and distribute them to target computers and the provisioning service/authority 104. In another embodiment, a separate entity or functional component might generate the credentials for use in performing authentication between the provisioning service/authority 104 and the target computer 106.

The provisioning device 102 may have a user interface 140 for interaction with a technician or other operator. The user interface 140 may prompt the technician for various information, such as user credentials, and may also allow the technician to select one of the available boot images 138 that should be provided to a connected target computer 106. The user interface 140 may allow the technician to specify various options regarding the provisioning of the target computer 106, such as the intended purpose of the target computer, its identity, its location, and so forth.

The provisioning device 102 may also include a boot interface 142 that operates in conjunction with the device port 112 to emulate a boot interface at the device port 112, from which the connected target computer 106 may boot. As part of the boot process, the boot interface 142 may implement a virtual disk, sometimes referred to as a RAMDISK, that is formatted as a boot device. When the target computer 106 starts up, it is configured to look to its device port 120 and to boot from the device found at that port—assuming that the connected device is formatted as a boot device.

To provision the target computer 106, the device port 112 of the provisioning device 102 is connected to the device port 120 of the target computer 106, and the target computer 106 is configured to boot from the device port 120. Upon startup, the target computer 106 looks to the device port 120 for a connected device containing a boot image from which to initialize itself.

The provisioning device 102 is configured to present one of the boot images 138 through the device port 112, and to act as a boot device from which the target computer 106 may boot.

The provisioning device 102 has boot selection logic 144 for determining which of the boot images 138 to present at the device port 112 for booting by the target computer 106. The boot selection logic 144 may be responsive to various different factors to determine which of the boot images 138 to present at the device port 112 for booting. For example, the boot selection logic 144 may be responsive to information previously provided by the provisioning service/authority 104 to determine which of multiple stored boot images 134 is to be presented for booting by any particular target computer. Alternatively, the boot selection logic 144 may contact the provisioning service/authority 104 after receiving a boot request from the target computer 106, to obtain authorization to present one of the boot images 134 for booting by the target computer 106, and/or to determine which of the boot images to be presented for booting.

The provisioning device 102 may have authentication and/or authorization logic 146 that is invoked prior to presenting one of the boot images 134 at the device port 112 for booting by the target computer 106. The authentication logic 146 may be configured to contact the provisioning service/authority 104 to both authenticate with the provisioning service/authority 104 and to obtain authorization to provide a boot image to the target computer 106. In some embodiments, the authorization logic may provide an identification of the target computer 106 to the provisioning service/authority 104, and may receive in return an authorization to provision the target computer 106 as well as a designation of a particular boot image 134 that should be provided to the target computer 106. Thus, the provisioning service/authority 104 may authorize a specific boot image to be provided to the target computer 106, based on the identity of the target computer 106, on reported characteristics of the target computer 106, and/or on the intended purpose and functionality of the target computer 106.

The authentication logic 114 may also coordinate and report the issuance of credentials 126 to various target computers. As part of provisioning the target computer 106, the provisioning device 102 may issue certain credentials 126 to the target computer 106, and may report this activity to the provisioning service/authority 104. Specifically, the provisioning device 102 may notify the provisioning service/authority 104 that certain credentials have been issued to a target computer 106, and may also provide an identification of the target computer 106 such as a MAC (media access control) address of the target computer 106. This may include sharing the issued credentials or a portion of the issued credentials with the provisioning service/authority 104, such as by indicating the public key corresponding to a private key issued to the target computer 106.

The credentials 126 may be generated and implemented in various ways. In general, credentials comprise security-related information that is distributed between the provisioning service/authority 104 and the target computer 106 so that the two entities can subsequently authenticate each other. This typically involves identifying keys or other information to the provisioning service/authority 104, along with an identification that associates the keys or other information with a particular target computer 106. Corresponding security information is also provided to the target computer 106.

Depending on the capabilities of the provisioning device 102, the boot selection logic 144 and the authentication logic 146 may communicate wirelessly with the provisioning service/authority 104. For example, the network port 114 may be a WiFi or cellular interface, allowing remote and wireless communications with the provisioning service/authority 104.

Note that the provisioning device 102 may have additional logic, programs, and/or components for performing various tasks, including tasks that may or may not be associated with the functionality described herein. In some implementations, the provisioning device 102 may be a general-purpose device such as a smartphone or similar handheld device, programmed by way of user-installed applications to perform the described functionality. In other implementations, the provisioning device 102 may be a specialized or custom device that is dedicated at least in part to providing the functionality described herein.

FIGS. 2A, 2B, 2C, and 2D illustrate an example provisioning sequence that may be implemented in the environment 100 of FIG. 1. In an initial process illustrated by FIG. 2A, the provisioning device 102 is connected for communications with the provisioning service/authority 104, such as by physically connecting the local USB port device port 112 of the provisioning device 102 to a compatible port of the provisioning service/authority 104. Either the user interface 140 of the provisioning device 102 or a similar interface to the provisioning service/authority 104 may be used to configure the provisioning device 102, and the configuring may include transferring the boot images 134 from the provisioning service/authority 104 to the provisioning device 102. The boot images 134 may include any combination of the loader images 122 and/or the system images 124.

The credentials 126 or other security information may also be generated by the provisioning service/authority 104 in this initialization process, and transferred to the provisioning device 102. In some situations, credentials and security information may be embedded in the boot images 134.

Once configured in this manner, the provisioning device 102 may be disconnected from the provisioning service/authority 104 and carried by a technician to the physical location of the target computer 106. The target computer 106 may be collocated with the provisioning service/authority 104, or may be located in a different physical location. In some situations, the target computer may be located remotely with respect to the provisioning service/authority 104, and may be connected to a local network other than that of the provisioning service/authority 104. Initially, there may or may not be network access between the target computer 106 and the provisioning service/authority 104.

Figure 2A:
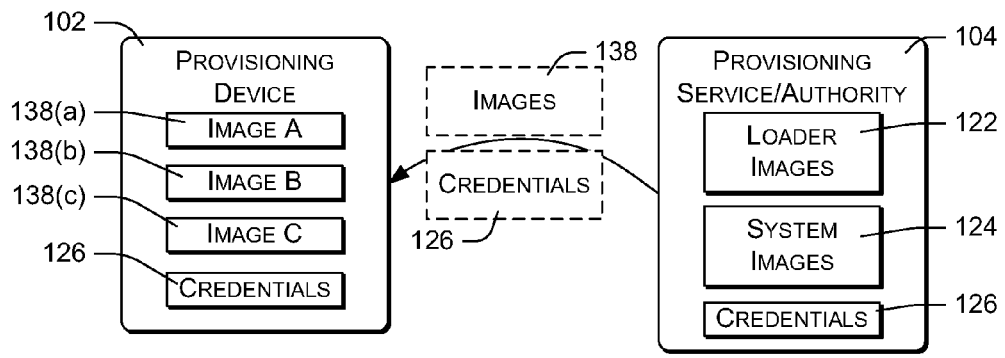
FIGS. 2A, 2B, 2C, and 2D are a series of block diagrams illustrating provisioning of a target computer using a mobile provisioning device.
Figure 2B:
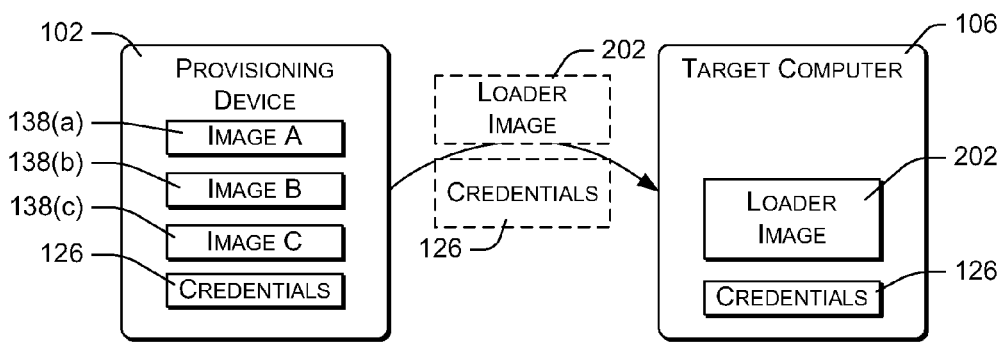

As illustrated by FIG. 2B, provisioning the target computer 106 may be performed by connecting the provisioning device 102 to the target computer 106 so that the provisioning device 102 and the target computer 106 can communicate with each other. In many situations, this will be through a physical, wired connection, using the device port 112 of the provisioning device 102 and the device port 120 of the target computer 106. For example, the technician may connect a USB cable between the provisioning device 102 and the target computer 106, thereby allowing the target computer 106 to access the provisioning device 102 as a boot device.

The technician may then start or power-on the target computer 106, which has been configured to access its local device port 120 to locate a boot device. Because the provisioning device 102 is connected to the local device port 120, the target computer 106 attempts to boot from the provisioning device 102. The provisioning device 102 presents a selected one of the boot images 134 to the target computer, through the local device port 112 of the provisioning device 102, and the target computer 106 boots from this boot image.

In the example of FIGS. 2A-2D, the initial boot image provided to the target computer 106 comprises a system loader, which is designated in FIG. 2B as loader image 202. The target computer 106 receives and executes the loader image 202 upon startup of the target computer 106. Credentials, from the credentials 126, may be embedded in the loader image 202, transferred along with the loader image 202, or transferred to the target computer 106 in a subsequent data exchange as the target computer executes the loader image 202.

Figure 2C:
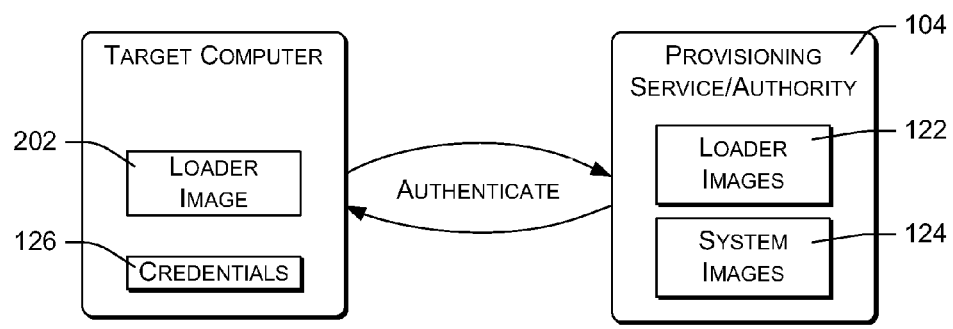

FIG. 2C illustrates an authentication procedure implemented by the loader image 202 and performed upon execution of the loader image 202. During the authentication procedure, the target computer 106 contacts the provisioning service/authority 104 and uses the previously provided credentials 126 to perform authentication between the target computer and the provisioning service/authority 104. This may include verifying the identity of the provisioning service/authority 104 and also proving the authenticity of the target computer 106. As part of the procedure, the target computer 106 may identify itself by providing its MAC address or some other uniquely identifying information that has previously been registered with the provisioning service/authority 104 and associated with the credentials 126 previously provided to the target computer 106.

Figure 2D:
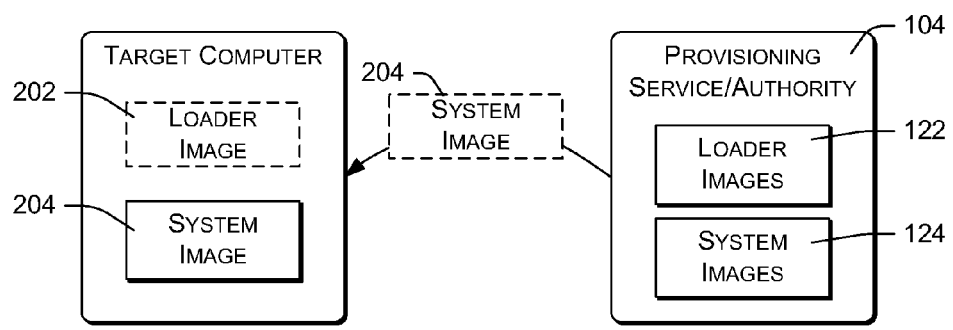

FIG. 2D illustrates the result of the target computer 106 executing the loader image 202. The system loader or loader image 202 is configured to communicate with the provisioning service/authority 104 and to obtain a system image 204, which may comprise one of the system images 124. The target computer 106 downloads the system image 204 to its non-volatile storage or other bootable media, and then boots from the system image 204.

In the process described above, the loader image 202 may be configured to specify or contain an identification of the provisioning service/authority 104, such as its network or Internet address. The loader image 202 may also be configured to specify or contain security information allowing the target computer 106 to authenticate with the provisioning service/authority 104. For example, the loader image 202 may be configured to contain or specify one or more of the credentials 126, and the system loader may be configured to present the credentials to the provisioning service/authority 104 to authenticate the target computer 106 with the provisioning service/authority 104. The loader image 202 may also be configured to contain or specify security information or credentials allowing the target computer 106 to authenticate and verify the identity of the provisioning service/authority 104. Transfer of the system image 204 may be contingent upon successful authentication of the target computer 106 with the provisioning service/authority 104, and of the provisioning service/authority 104 with the target computer 106.

In addition, the loader image 102 may be configured upon execution to configure the firmware 134 of the target computer, and to embed the credentials 126 and an address or identification of the provisioning service/authority 104 in the firmware 134. The firmware 134 may be configured to utilize this information in subsequent startups. For example, the firmware 134 may be configured to receive future configuration and provisioning information by contacting and authenticating with the identified provisioning service/authority 104, using the embedded security credentials. Techniques such as this are described in a co-pending U.S. application Ser. No. 13/166,641, filed on Jun. 22, 2011, entitled "Secure Computer Provisioning" and a co-pending U.S. application Ser. No. 13/166,610, filed on Jun. 22, 2011, entitled "Global Computer Provisioning," both of which are incorporated herein by reference in their entirety.

Figure 3:
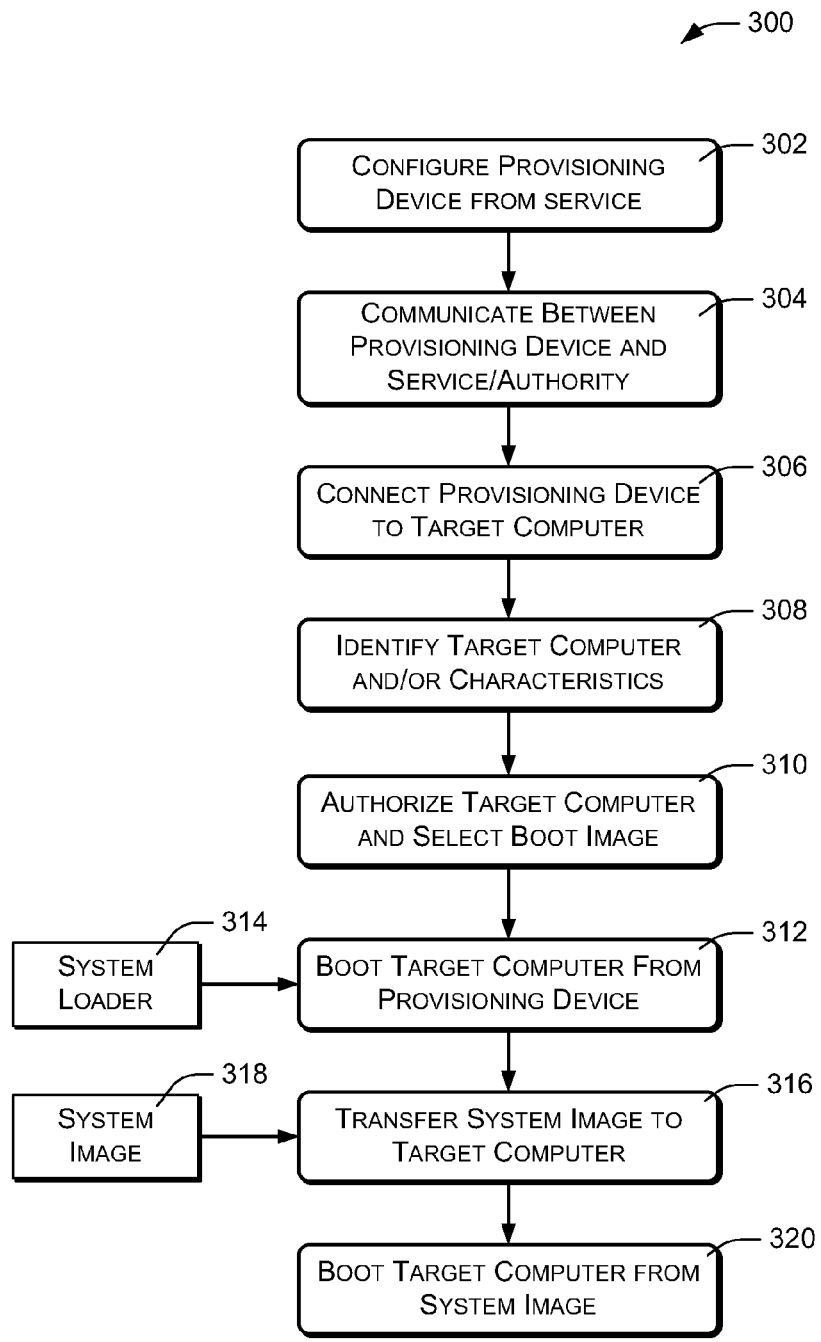
FIG. 3 is a flow diagram illustrating an example method of provisioning networked computers from a mobile provisioning device.

FIG. 3 illustrates the described techniques in the form of a flowchart, which is generally designated by the reference numeral 300. An action 302 comprises configuring the provisioning device 102 from a provisioning service, which may comprise performing the configuration from a server or other component associated with the provisioning service/authority 104. This action may comprise physically connecting the provisioning device 102 to the provisioning service/authority 104 with a wired connection such as a USB connection. Alternatively, a dedicated application installed on the provisioning device 102 may connect to the provisioning service/authority 104 over a network such as the Internet. Security measures, including authentication and encryption procedures, may be used to ensure that only authorized devices are able to access the provisioning service/authority 104 in this manner.

The configuring 302 may also comprise transferring the boot images 138 from the provisioning service/authority 104 to the mobile provisioning device 102, where they are stored in the image memory 136 of the provisioning device 102. The boot images 138 may comprise any of the loader images 122 and/or the system images 124.

Security credentials may be embedded in the boot images 138 or provided separately. In some embodiments, the provisioning device 102 itself may be provided a master security credential, so that the provisioning device 102 may contact and authenticate with the provisioning service/authority at times when a physical or wired connection with the provisioning service/authority 104 is not possible. In some embodiments, the provisioning device 102 may create further credentials for use by target computers, based on the previously obtained master security credentials.

After the initial configuring 302, the provisioning device 102 may perform an action 304 of communicating with the provisioning service/authority 104. This communication, subsequent to the configuring 302, may be performed remotely, without physical connection or proximity to the provisioning service/authority 104. Wireless communications capabilities of the provisioning device 102 may be used to perform this action.

The communicating 304 may be performed periodically, or upon connection to an individual target computer. For example, the provisioning device 102 may periodically connect and synchronize with the provisioning service/authority 104. During this periodic connection, the provisioning device 102 may report its activities, such as whether it has provisioned any target computers 106 and/or the identity of any such provisioned computers. The provisioning device may also, or alternatively, report the issuance of credentials to identified target computers 106, configuration information about provisioned computers 106, and/or other information about target computers or desired provisioning operations.

In certain embodiments, computers to be provisioned may be registered, prior to their provisioning, with the provisioning service/authority 104. For example, serial numbers, MAC addresses, Internet protocol (IP) addresses, or other identifying information regarding computers to be provisioned may be provided to the provisioning service/authority 104, and configuration information may also be provided regarding respective computers. This information may be subsequently relayed to the provisioning device 102 during the periodic connection of the action 304, to be used in determining how to provision different computers.

Alternatively, the provisioning device 102 may be used to provision new target computers, and it may subsequently report to the provisioning service/authority 104, during the periodic connection 304, that it has authorized individually identified computers to obtain system images from the provisioning service/authority 104. In doing this, the provisioning device 102 may also report or identify credentials that have been issued to the provisioned target computers, along with the identifications of those computers, so that the provisioning service/authority 104 can associated specific credentials with specific target computers.

The communicating 304 may, alternatively or additionally, be performed before, during, and/or after the connection of the provisioning device 102 to the target computer 106. For example, the provisioning device 102 may connect to the provisioning service/authority 104 upon or prior to connection to a target computer 106. During this communication, the provisioning device 102 may authenticate with the provisioning service/authority 104 by providing credentials to the provisioning service/authority 104 and by receiving and verifying credentials from the provisioning service/authority 104. The provisioning device 102 may also obtain authorization to provision the target computer 106, or otherwise determine whether the target computer is authorized for provisioning, and may receive credentials that are designated specifically for the target computer 106.

The provisioning device 102 may also communicate with the provisioning service/authority 104 subsequent to a connection with the target computer 106. Such a communication may similarly include authenticating with the provisioning service/authority 104, and may include reporting any provisioning that has taken place. For example, the provisioning device 102 may report the name of the target computer 106 and any credentials issued to the target computer 106, and thereby authorize the target computer 106 to perform further provisioning operations in conjunction with the provisioning service/authority 104. The provisioning device 102 may also report the boot image that was used for booting the target computer 106.

An action 306 comprises connecting the provisioning device 102 to the target computer 106. As mentioned above, this may be by way of a wired connection such as a USB connection. In the described embodiments, the provisioning device is connected as a local boot device.

An action 308 comprises identifying the connected target computer 106. For example, the target computer 106 may be configured to boot from the connected provisioning device 102, and during this process may report its MAC address or some other identifier to the provisioning device. Alternatively, a technician may utilize the user interface of the provisioning device 102 to manually identify the target computer 106 to the provisioning device. In some embodiments, image capture hardware of the provisioning device 102, such as a camera, may be used to capture an identifying image associated with the target computer prior to provisioning, such as an image of a barcode or serial number. Other types of automated identification may alternatively be used, such as radio-frequency identification (RFID), near-field communications (NFC), and so forth.

Rather than uniquely identifying the target computer, a technician may use the user interface of the provisioning device 102 to specify characteristics and/or desired functionality of the target computer, and the provisioning device 102 may select the appropriate boot image based on this information. Alternatively, the technician may explicitly specify the boot image that should be used to provision the target computer 106.

An action 310 comprises authorizing the identified target computer 106 and determining or selecting one of the available boot images 138 for access by the target computer 106. The provisioning device 102 may determine whether the target computer 106 is authorized by communicating with the provisioning service/authority 104, or based upon data obtained during previous communications with the provisioning service/authority 104, such as during the action 304. For example, the action 304 may explicitly identify computers that are authorized to boot from the provisioning device 102, and may additionally specify which of the boot images 138 should be provided for booting by the target computer 106.

An action 312 comprises booting the target computer 106 from the provisioning device 102, using the boot image that was selected from the action 310. During this action, the provisioning device 102 emulates a boot device, and presents the selected boot image at its device port 112. The target computer 106 is pre-configured to examine its device port 120 for the presence of a boot device, and to boot from such a device if it is available. As described above, the provisioning device 102 may create a virtual RAMDISK that is accessible through its device port 112, formatted as a boot device with the boot image selected in the action 310.

The action 312 may include issuing security credentials to the target computer 106. For example, such security credentials may be contained or indicated by a boot image provided to the target computer 106 for booting. The security credentials may be used by the target computer 106 for subsequent provisioning activities. The boot image may also indicate or include an identification of a provisioning server.

The boot image presented at the device port 112 is loaded and executed by the target computer 106. In some situations, the boot image comprises a low-level system loader, which is executed to perform further boot and provisioning operations. Specifically, in the embodiment illustrated by FIG. 3, the boot image is a system loader 314 that is executed by the target computer 106 to initialize low-level aspects of computer operation such as network connectivity, firmware configuration, and so forth. In addition, the system loader 314 is executed by the target computer 106 to perform an action 316 of transferring a system image 318 to the target computer 106. The system image 318 may be obtained either from the provisioning device 102 or from the provisioning service/authority 104, in a process that will be described in more detail below with reference to FIGS. 4 and 5.

An action 320 comprises booting the target computer from the system image, after obtaining and storing the system image.

Figure 4:
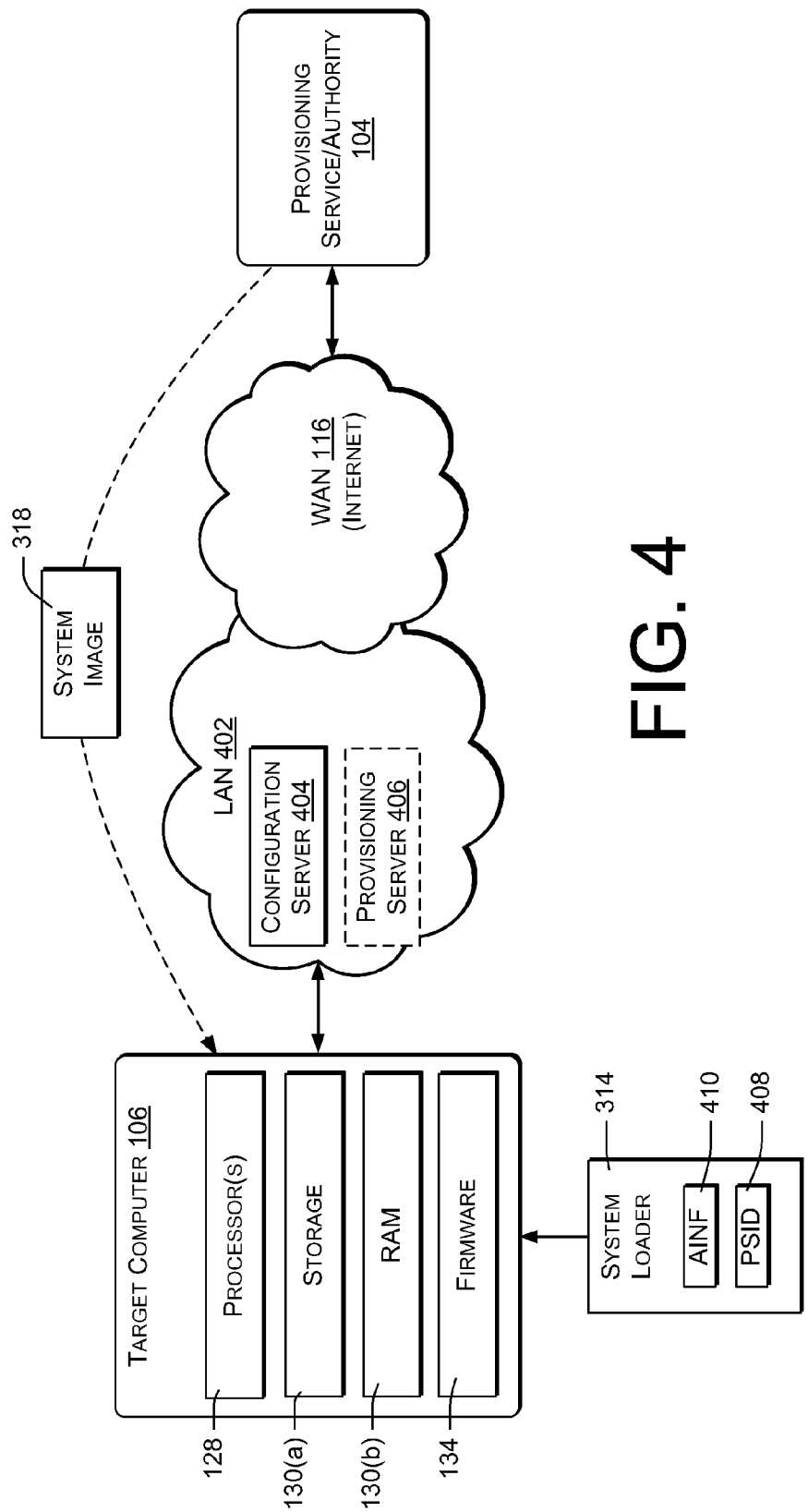
FIG. 4 is a block diagram illustrating provisioning a target computer in conjunction with a provisioning service/authority.

FIG. 4 illustrates an example of how the target computer 106 may perform the action 316 of provisioning itself from the provisioning service/authority 104 and thereby obtaining a system image. FIG. 4 assumes that the target computer 106 is given access to a bootable system loader or loader image 314, which has been obtained by the provisioning device 102 from the provisioning service/authority 104, and presented as a RAMDISK to the target computer 106 by the provisioning device 102.

As described above, the operating logic of the target computer 106 may comprises one or more processors 128 that execute instructions and programs that are stored in or retrieved from various types of computer-readable memory 130. Examples of such memory are categorized in FIG. 4 as storage 130(*a*), random-access memory (RAM) 130(*b*), and BIOS or firmware 134. Storage 130(*a*) typically comprises a hard-disk or similar non-volatile memory, and may include external devices. RAM 130(*b*) may comprise electronic memory or other types of relatively fast, electronically-accessible memory. Firmware 134 may comprise read-only memory (ROM), flash memory, or any other type of persistent memory that can be accessed by the processor 128. The firmware 134 may include pre-boot information for the target computer 106, such as instructions, modules, and/or routines for initializing itself and for obtaining its operating software.

More specifically, the pre-boot information may comprise instructions that the processor 128 will execute upon being powered on.

In the described embodiment, the firmware 134 is configured to initialize low-level device operations, such as operation of the local device port 112 of the target computer 106, and to search local device ports for bootable devices. In particular, it is configured to boot from the connected provisioning device 102, assuming that the provisioning device is connected to the local device port 120 of the target computer 106.

As already described, the provisioning device 102 is configured to present a system loader image 314 for booting by the target computer. The target computer 106 executes the bootable system loader image 314 as part of its initial operations.

The system loader 314 is configured to broadcast a network configuration request to a local network or LAN 402, to which an available configuration server 404 may respond. For example, the target computer 106 may obtain a local network address and other network parameters for use in communicating over the local network 402, and as a result over the Internet or other wide-area network 116.

The computer firmware 134 and/or the system loader 314 may also be responsible for other things, such as initially communicating with various hardware elements of the target computer 106.

In the illustrated embodiment, the system loader 314 is configured to receive initial network configuration information from the local configuration server 404. Note that the local network 402 may also have a local provisioning server 406, from which computers may be provisioned. The local configuration server 404 may instruct the target computer 106 to perform computer provisioning from the local provisioning server 406.

More specifically, the configuration server 404 may be a DHCP server, and the system loader 314 may be configured to query the configuration server 404 for network configuration information using the DHCP protocol. As part of the DHCP protocol, the configuration server 404 may provide the network address of the provisioning server 406. The provisioning server 406 may be a PXE server, from which the target computer 106 can obtain a bootable software image.

In the described embodiment, however, the system loader 314 is configured to contain or specify a provisioning service identification (PSID) 408, identifying the provisioning service/authority 104 from which the target computer 106 is to obtain a system image. If the target computer 106 receives a local assignment of a provisioning server 406 from the local configuration server 404, the local assignment is ignored in favor of the provisioning service identified by the provisioning service identification 408, which has been pre-configured within the system loader 314. The provisioning service identification 408 may be an IP address, a URL, or some other type of specification allowing the target computer 106 to identify and access one or more provisioning services via the wide-area network 116. Thus, after receiving local network configuration information, the target computer 106 contacts the provisioning service/authority 104 through the wide-area network 116 and downloads the system image 318. Communications between the target computer 106 and the provisioning service/authority 104 may utilize PXE communication and file transfer protocols.

The system loader 314 may in some embodiments be further customized to contain authentication information (AINF) 410, which may include or be part of the credentials 126 discussed above. The authentication information 410 enables the target computer 106 to verify the identity of the provisioning service/authority 104, and may also allow the target computer 106 to authenticate itself with the provisioning service/authority 104. Using the authentication information 410, the target computer 106 can ensure that it is communicating with the intended provisioning service/authority 104. Similarly, the provisioning service/authority 104 can ensure that it provisions only authorized target computers. The authentication information 410 may also allow the provisioning service/authority 104 to reliably identify the target computer 106, and to thereby provide customized provisioning information and software for different requesting devices.

Note that the functionality attributed above to the system loader 314 may alternatively be implemented by the firmware 134 of the target computer 106. For example, the system loader 314 may, upon execution, configure the firmware 134 to perform the operations discussed above with reference to FIG. 4. After configuring the firmware 134 in this manner, the computer may be restarted, whereupon the firmware executes and performs provisioning from the provisioning service/authority 104.

Figure 5:
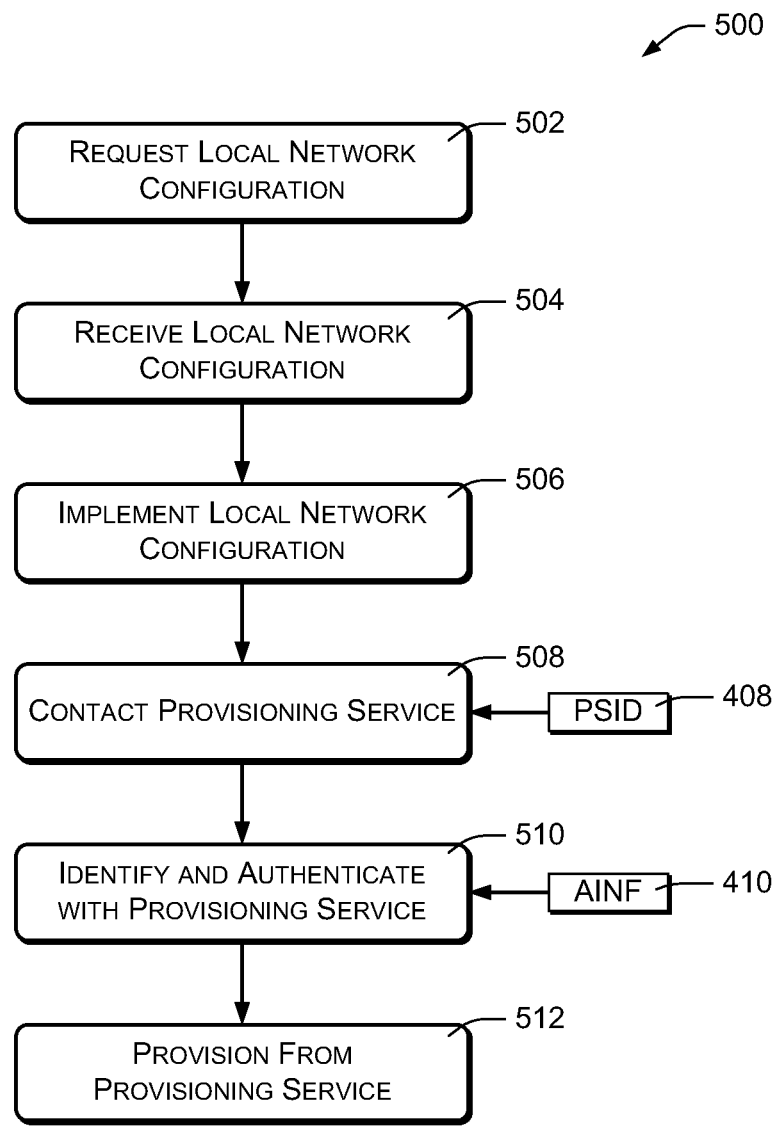
FIG. 5 is a flow diagram illustrating an example method for provisioning a target computer in conjunction with a provisioning service/authority.

FIG. 5 illustrates an example process 500 for obtaining a system image in conjunction with the techniques described above. This process may be implemented by the system loader 314 of FIG. 4, which in turn may be presented by the mobile provisioning device 102 for booting by the target computer 106. It may alternatively be implemented by computer firmware that has been configured by the system loader 314.

The example process 500 is described with reference to the environment of FIG. 4. In this environment, provisioning comprises configuring or re-configuring a computer for a particular purpose. Provisioning may include providing and installing a hard disk image for the computer, and/or providing other data to be stored on the hard disk or other memory of the computer. Provisioning may further include organizing hard disk data and configuring computer hardware, software, and firmware components for specialized operation. Provisioning may include installing, re-installing, configuring, and/or securing computer operating systems, applications, and other computer components, as well as defining, configuring, and initiating various tasks to be performed by the target computer. Provisioning may include customizing or personalizing the target computer in various ways, depending on the functions to be performed by the target computer and/or the environment in which it will operate.

An action 502 comprises requesting a local network configuration from the local configuration server 404. An action 504 comprises receiving the requested local network configuration from the configuration server 404. In certain embodiments, the actions 502 and 504 may involve network DHCP communications, such as broadcasting a DHCP request on the local network 402 and receiving a DHCP response from a DHCP server. The received local network configuration may include an IP address for adoption by the requesting target computer 106, as well as other network parameters such as gateway addresses, DNS server addresses, communication parameters, and so forth. The received local network configuration may also specify a provisioning server such as a PXE server, although the requesting target computer 106 is configured by way of the system loader 314 to ignore any such indication of a provisioning server.

An action 506 comprises implementing the received local network configuration. This may include initializing network parameters as described above. However, provisioning information, such as PXE information provided by the local configuration server 404, is ignored in favor of the provisioning information that is specified by the system loader 314.

An action 508 comprises contacting and establishing communications with the provisioning service/authority 104, whose global identity and/or address is indicated by the embedded provisioning service identification 408. Communications between the target computer 106 and the provisioning service/authority 104 may utilize conventional communications protocols, including PXE protocols, file transfer protocol (FTP), and others. In certain embodiments, the PXE protocol may be configured or extended to use secure protocols such as hypertext transfer protocol secure (HTTPS). Other secure communications protocols may alternatively be employed, either independently or in conjunction with existing provisioning protocols.

An action 510 may comprise identifying and authenticating with the provisioning service indicated by the embedded provisioning service identification 408, based on the authentication information 410 that has been embedded in the system loader 314. Identifying may include providing a configuration identifier or code to the provisioning service/authority 104. Such a configuration code may correspond to a computer, user, customer, or account, and may be used by the provisioning service/authority 104 to determine how to respond to provisioning requests. For example, the provisioning service/authority 104 may be configured to provision requesting computers differently, depending on their identification as indicated by a provided configuration code. Groups of computers using the same configuration code may be configured or provisioned in the same manner, while different computers, using different configuration codes, may be configured or provisioned differently. In some cases, a computer identification code such as the computer's MAC address may be used to form at least part of the computer or provision identification code.

The action 510 may also include authentication between the requesting target computer 106 and the provisioning service/authority 104. Authentication between these two entities may be unilateral, involving only the authentication of the provisioning service/authority 104 or of the target computer 106. Alternatively, the authentication may be bilateral, in which both the target computer 106 and the provisioning service/authority 104 authenticate themselves to each other.

The authentication action 510 may include the exchange and/or validation of one or more certificates, signatures, credentials, keys, key pairs, and so forth, and may utilize cryptographic elements and techniques. For example, the authentication information 410 may include a public cryptographic key corresponding to a private cryptographic key belonging to the provisioning service/authority 104. In order to authenticate the provisioning service/authority 104, the provisioning service/authority 104 may provide a signature that has been created with the private key, which the target computer 106 may validate using the corresponding public key. Similarly, the authentication information 410 may include account credentials that may be submitted to the provisioning service/authority 104 to authorize and/or authenticate the target computer 106, and which grant the target computer 106 privileges with respect to the provisioning service/authority 104.

An action 512 comprises provisioning the target computer 106 from the provisioning service 104. This may involve receiving software, which may include boot routines, drivers, programs, applications, operating systems, scripts, and so forth. Furthermore, the provisioning may be customized based in the identity of the requesting computer 106. In other words, the provisioning service/authority 104 may be configured to provide different provisioning information to different computers or groups of computers. As mentioned above, the communications between the computer 106 and the provisioning service/authority 104 may specify an account and/or group to which the requesting computer 106 belongs. The provisioning service/authority 104 may be configured to provision requesting computers in accordance with the accounts or groups to which they belong. This may be useful in situations where the provisioning service/authority 104 provides provisioning services to multiple different customers, accounts, and so forth; and/or where different provisioning may be needed for different groups of requesting computers.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A mobile provisioning device, comprising:
   image memory configured to store multiple system loader images;
   one or more processors;
   computer-readable memory storing instructions that are executable by the one or more processors to emulate a boot device upon connection of the mobile provisioning device to a target computer, wherein a selected one of the multiple system loader images is presented to the target computer for booting, and wherein the selected one of the multiple system loader images identifies a provisioning service;
   the selected one of the multiple system loader images specifying instructions that are executable by the target computer to perform actions comprising:
      authenticating with the provisioning service identified by the selected one of the system loader images; and
      obtaining a system image from the provisioning service identified by the selected one of the system loader images.

2. The mobile provisioning device of claim 1, wherein the selected one of the system loader images indicates security information for authenticating with the provisioning service identified by the selected one of the system loader images.

3. The mobile provisioning device of claim 1, the instructions being further executable by the one or more processors to:
issue credentials to the target computer for authenticating with the provisioning service identified by the selected one of the system loader images; and
report issuance of the credentials to the provisioning service identified by the system loader image along with an identification of the target computer.

4. The mobile provisioning device of claim 1, the instructions being further executable by the one or more processors to select the selected one of the system loader images based at least in part on an identification of the target computer.

5. A mobile provisioning device, comprising:
one or more processors;
image memory configured to store multiple boot images;
boot selection logic executable by the one or more processors to receive information provided by a provisioning authority and, at least partly responsive to receiving the information, to select one of the multiple boot images to present for booting by a target computer; and
a device communications port that upon connection to the target computer emulates a boot device and presents the selected one of the multiple boot images for booting by the target computer.

6. The mobile provisioning device of claim 5, wherein the boot selection logic is further executable to obtain authorization to present the selected one of the multiple boot images from the provisioning authority prior to presenting the selected one of the multiple boot images for booting by the target computer.

7. The mobile provisioning device of claim 5, further comprising authentication logic executable by the one or more processors to authenticate with the provisioning authority prior to presenting the selected one of the multiple boot images for booting by the target computer.

8. The mobile provisioning device of claim 5, further comprising authorization logic executable by the one or more processors to communicate wirelessly with the provisioning authority to receive authorization prior to presenting the selected one of the multiple boot images for booting by the target computer.

9. The mobile provisioning device of claim 5, further comprising a network communications port configured for communications with the provisioning authority to receive the multiple boot images.

10. The mobile provisioning device of claim 5, wherein the boot selection logic is further executable by the one or more processors to receive an identification of the target computer and, at least partly responsive to receiving the identification, to select the one of the multiple boot images to be presented to the target computer for booting.

11. The mobile provisioning device of claim 5, wherein at least one of the multiple boot images comprises a system loader that is executable by the target computer to obtain a system image.

12. The mobile provisioning device of claim 5, wherein at least one of the multiple boot images comprises a system loader containing instructions that are executable by the target computer to obtain a system image from a provisioning server that is identified by said at least one of the multiple boot images.

13. The mobile provisioning device of claim 5, wherein at least one of the multiple boot images comprises a system loader containing instructions that are executable by the target computer to configure firmware of the target computer to obtain a system image from a provisioning server that is identified by said at least one of the multiple boot images.

14. The mobile provisioning device of claim 5, wherein at least one of the multiple boot images comprises a system loader containing instructions that are executable by the target computer to perform actions comprising:
receiving a network configuration from an available configuration server upon startup; and
obtaining a system image from a provisioning service that is identified by said at least one of the multiple boot images.

15. The mobile provisioning device of claim 5, wherein at least one of the multiple boot images comprises a system loader containing instructions that are to be embedded in firmware of the target computer, the instructions being executable by the target computer to configure perform actions comprising:
receiving a network configuration from an available configuration server upon startup; and
obtaining a system image from a provisioning service that is identified by said at least one of the multiple boot images.

16. The mobile provisioning device of claim 5, wherein at least one of the multiple boot images comprises a system loader containing instructions that are executable by the target computer to perform actions comprising:
receiving a network configuration from an available configuration server;
obtaining a system image from a provisioning service that is identified by said at least one of the multiple boot images; and
authenticating with the provisioning authority prior to obtaining the system image, wherein the authenticating is based at least in part on credentials indicated by said at least one of the multiple boot images.

17. The mobile provisioning device of claim 5, wherein at least one of the multiple boot images includes information enabling the target computer to verify the identity of a provisioning service in order to securely obtain a system image from the provisioning service.

18. The mobile provisioning device of claim 5, wherein:
at least one of the multiple boot images contains credentials that allow the target computer to authenticate with a provisioning service in order to obtain a system image from the provisioning service; and
the mobile provisioning device is configured to report to the provisioning authority that the credentials have been issued to the target computer.

19. A method, comprising:
storing a computer boot image in memory of a mobile device;
communicating with a provisioning authority to determine whether a particular target computer is authorized with respect to the computer boot image, wherein the computer boot image identifies the provisioning authority;
communicating the mobile device to the particular target computer as a boot device; and
if the particular target computer is authorized with respect to the computer boot image,
presenting the computer boot image to the particular target computer, via the mobile device, for booting upon identification of the particular target computer.

20. The method of claim 19, further comprising:
obtaining credentials from the provisioning authority to enable the particular target computer to authenticate with the provisioning authority; and
providing the credentials to the particular target computer.

21. The method of claim 19, further comprising:
obtaining credentials from the provisioning authority to enable the particular target computer to authenticate with the provisioning authority;
providing the credentials to the particular target computer; and
reporting, to the provisioning authority, an identification of the target computer to which the credentials have been provided.

22. The method of claim 19, wherein the communicating is performed prior to the connecting.

23. The method of claim 19, further comprising obtaining an identification of the particular target computer upon connecting to the particular target computer, wherein the communicating comprises providing the identification to the provisioning authority.

24. The method of claim 19, further comprising authenticating the particular target computer with the provisioning authority prior to presenting the computer boot image to the particular target computer.

25. The method of claim 19, further comprising obtaining an identification of the particular target computer upon connecting to the particular target computer, wherein the computer boot image is selected based at least in part on the identification of the particular target computer.

26. The method of claim 19, wherein the computer boot image comprises a system loader that is executable by the particular target computer to obtain a system image.

27. The method of claim 19, wherein the computer boot image comprises a system loader that is executable by the particular target computer to obtain a system image from a provisioning server that is identified by the computer boot image.

28. The method of claim 19, wherein the computer boot image comprises a system loader that is executable by the particular target computer to perform actions comprising:
receiving a network configuration from an available configuration server upon startup; and
obtaining a system image from the provisioning authority that is identified by the computer boot image.

29. The method of claim 19, wherein the computer boot image comprises a system loader that is executable by the particular target computer to perform actions comprising:
receiving a network configuration from an available configuration server upon startup;
obtaining a system image from the provisioning authority that is identified by the computer boot image; and
authenticating with the provisioning authority prior to obtaining the system image, wherein the authenticating is based on security information indicated by said particular one of the one or more computer boot images.

30. The method of claim 19, wherein the computer boot image includes information that enables the particular target computer to verify the identity of the provisioning authority in order to obtain the system image from the provisioning authority, the method further comprising reporting to the provisioning authority that the information has been issued to the particular target computer.

31. The mobile provisioning device of claim 1, wherein the actions further comprise receiving a network configuration from an available configuration server upon startup.

32. The mobile provisioning device of claim 1, wherein the actions further comprise storing at least one of the system image and the selected one of the system loader images in the image memory of the mobile provisioning device prior to connecting the mobile provisioning device to the target computer.

33. The mobile positioning device of claim 5, the actions further comprising receiving a network configuration from an available configuration server upon startup.

34. The method of claim 19, wherein the computer boot image comprises a system loader that is executable by the particular target computer to perform actions comprising receiving a network configuration from an available configuration server upon startup.

\* \* \* \* \*